United States Patent [19]

Koseki

[11] Patent Number: 4,680,771
[45] Date of Patent: * Jul. 14, 1987

[54] MIRROR ADJUSTMENT DEVICE IN LASER OSCILLATOR

[75] Inventor: Ryoji Koseki, Buena Park, Calif.

[73] Assignee: Amada Engineering Service Co., Inc., La Mirada, Calif.

[*] Notice: The portion of the term of this patent subsequent to Jun. 9, 2004 has been disclaimed.

[21] Appl. No.: 814,981

[22] Filed: Dec. 31, 1985

[51] Int. Cl.$^4$ ............................................... H01S 3/08
[52] U.S. Cl. ................................... 372/107; 372/108; 372/65; 350/633
[58] Field of Search ................... 372/107, 108, 55, 98, 372/61, 99, 65; 350/636, 63, 634

[56] References Cited

FOREIGN PATENT DOCUMENTS 2097148 10/1982 United Kingdom ................ 372/107
0901968 1/1982 U.S.S.R. ............................. 372/107

Primary Examiner—Leon Scott, Jr.
Attorney, Agent, or Firm—Wigman & Cohen

[57] ABSTRACT

A mirror adjustment device in a laser oscillator has a mirror holder which is mounted for free rotation about the X and Y axes of the laser. Pivot means are supported on the mirror holder bracket and about the mirror holder and drive means are connected with the pivot means to selectively rotate the mirror holder to adjust the mirror. Injection holes are also provided in the mirror holder whereby fresh laser gas may be injected in the direction of the mirror to clean and cool the mirror.

9 Claims, 6 Drawing Figures

MIRROR ADJUSTMENT DEVICE IN LASER OSCILLATOR

BACKGROUND OF THE INVENTION

1. Field of the Invention

This invention relates to a gas laser oscillator. More specifically, it relates to a device which adjusts the output mirror or rear mirror in a gas laser oscillator.

2. Description of the Related Art

There are several types of gas laser oscillator, including a high-speed axial flow type, biaxial transverse type and triaxial transverse type. All of them have a rear mirror and output mirror, and adjusting the angles of these mirrors in extremely troublesome. The holder which supports the output mirror or rear mirror can be moved slightly along the X-axis and Y-axis which are both perpendicular to the laser light beam axis, and can also be rotated slightly around the X axis and Y axis.

Adjustment of the position and angle of the mirror holder is generally done by fine adjustment of the mirror holder and of several micrometers which are located around the mirror holder. The fine adjustment of the mirror holder must be carried out within a confined space limited, for example, by the laser machine tool to which the laser oscillator is attached. In addition, since the laser beam is output from the laser oscillator output mirror, fine adjustment of the mirror holder may be hazardous.

SUMMARY OF THE INVENTION

The first purpose of this invention is to provide a mirror adjustment device which easily and automatically performs adjustment of the mirror holder which supports the rear mirror or output mirror.

The second purpose of this invention is to provide a mirror adjustment device which cools the mirror that is supported by the mirror holder.

The third purpose of this invention is to provide a mirror adjustment device which prevents small amounts of blower lubricating oil, which tend to be present in the laser gas, from adhering to the mirror.

In order to achieve the objectives of the invention the mirror holder which supports either the output mirror or the rear mirror 15 mounted in such a manner that it is rotatable above a first axis which is parallel to the X axis and also above a second axis which is parallel to the Y axis. An adjustment motor selectively causes the mirror holder to rotate slightly above the first axis and second axis. In addition, there are a suitable number of injection holes in the mirror holder through which fresh laser gas is sprayed at the mirror.

BRIEF DESCRIPTION OF THE DRAWINGS

FIG. 5 (B) is a side elevational view corresponding to FIG. 5 (A).

Referring to FIG. 1, generally designated by the reference numeral 1 is a laser processing system which is provided with a laser oscillator 3. The laser oscillator 3 is mounted on the rear of the laser processing system 1 so as to generate a laser beam LB in the direction toward the laser processing system 1.

Figure 1:
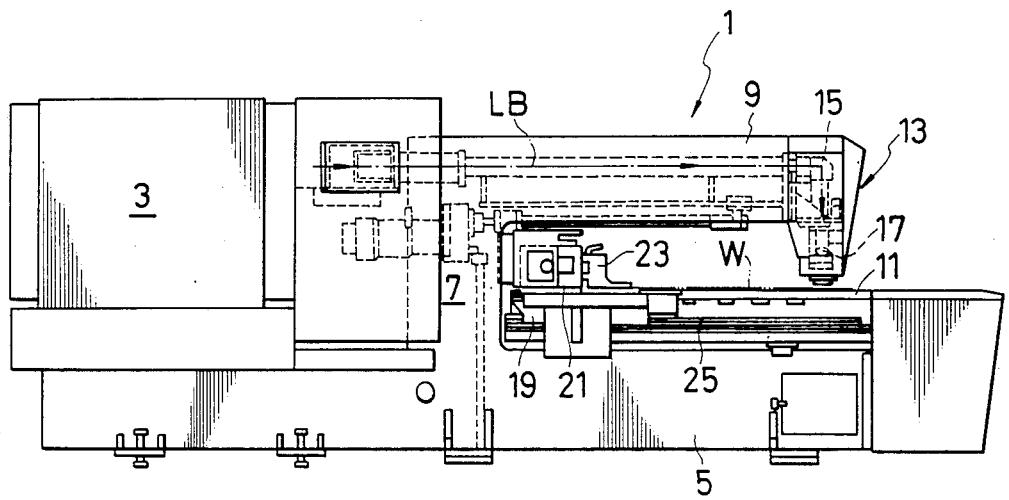
FIG. 1 is a front elevational view of a laser processing system provided with a laser oscillator according to the present invention.

The laser processing system 1 consists of a base 5, a post 7 which rises perpendicularly from the base 5, and an overhead beam 9 which is provided above and supported horizontally in a cantilever manner by the post 7. Disposed on the base 5 is a work table 11 on which a large number of slide balls are rotatably positioned to support a sheet work piece W to be processed in a horizontal position. A processing head assembly body 13 is mounted on the free end of the above-mentioned overhead beam 9; a mirror assembly 15 and a light focusing lens 17 are built into the processing head assembly body 13. The above-mentioned mirror assembly 15 reflects laser beam LB generated by the laser oscillator 3 in the direction of workpiece W. The light focusing lens 17 concentrates the light of laser beam LB and is mounted in such a position that it aims laser beam LB at the workpiece W together with an assisting gas such as oxygen. Consequently, the laser processing system 1, which is constructed as described previously, receives the laser beam LB from the laser oscillator 3 and aims the laser beam LB at the workpiece W through the light focusing lens 17 which is mounted inside the processing head assembly 13.

In order to move and position in place the workpiece W to be processed, the laser processing system 1 has a first carriage 19 which is free to move horizontally and a second carriage 21 which has a plurality of clamping devices 23 which clamp the workpiece W in position. The first carriage 19 is movably supported on a pair of rails 25 which are mounted parallel to each other on the base 5 along the opposite sides thereof, and is free to move toward and away from the processing area directly below the processing head assembly 13, when driven by power. The second carriage 21 which has the clamping devices 23 is slidably supported on the first carriage 19 and movable horizontally when driven in a direction perpendicular to the above-mentioned rails 25. Consequently, the workpiece W which is clamped in place by the clamping devices 23 can be moved on the work table 11 by the motion of the first carriage 19 and the second carriage 21 to a position directly below the processing head assembly 23.

In the above-mentioned configuration, by positioning the workpiece W immediately below the processing head assembly 13 on the work table 11 by means of the motion of the first carriage 19 and the second carriage 21, the workpiece W is processed by the laser beam LB. Of course, the laser beam LB, which is generated by the laser oscillator 3, is directed at the processing head assembly 13 and directed downward as shown by the arrow by the mirror assembly 15. Then, after the light is concentrated by the light focusing lens 17, it is directed at the workpiece W together with an assisting gas such as oxygen.

Now referring to FIGS. 2 through 5, the laser oscillator 3 comprises a support trestle 27 which supports the whole oscillator, a laser oscillation or lasing section 29 which is supported on the support trestle 27, and an adjustment attachment section 31 which is used for adjustment of the optical system of the laser processing system 1 and/or for adjustment of the mirrors in the laser oscillation section 29. That is to say, the support trestle 27 is constructed of a plurality of square pipes arranged in a rectangular shape; box-shaped support platforms 33A and 33B, which stand on the right and left sides of the support trestle 27, in turn support the laser oscillation section 29. The adjustment attachment section 31 may be mounted on the support platform 33A on the output side of the laser oscillation section 29.

Figure 2:
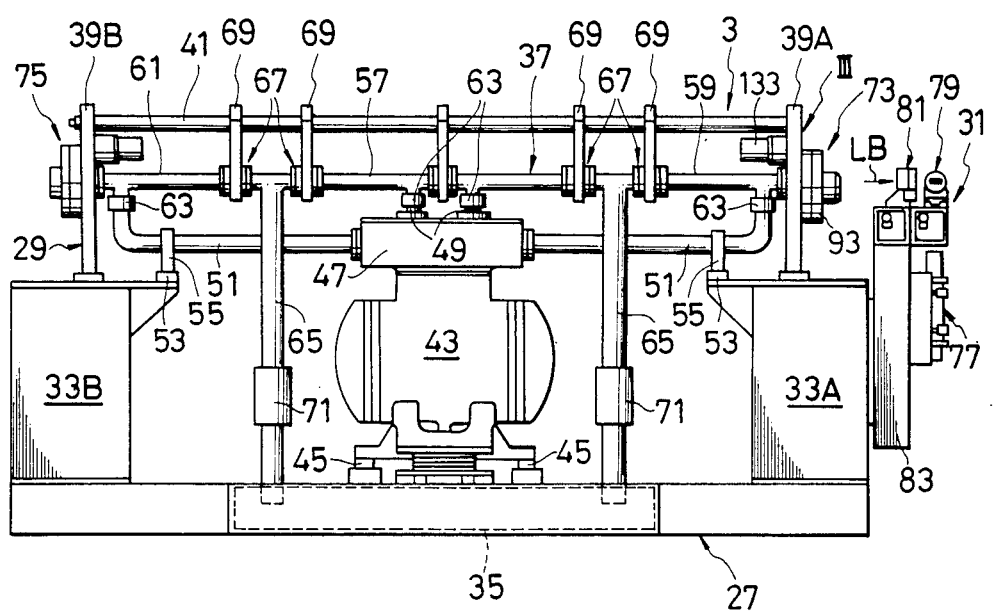
FIG. 2 is a front elevational view of the laser oscillator according to the present invention.

As clearly understood from FIG. 2, in order to cool the laser gas comprising a gas mixture of He, $N_2$ and $CO_2$ recirculated from the laser oscillation section 29, a relatively large main heat exchanger 35 is provided at the central portion of the support trestle 27. The main heat exchanger 35 is provided with bent tubes for receiving a coolant such as cooling water and with a plurality of cooling fins etc.

The laser oscillation section 29 comprises a laser tube 37 extending in the right and left directions to resonate and amplify the excitation light. The opposite ends of the laser tube 37 are supported by vertical support plates 39A, 39B which are supported by the support platforms 33A and 33B. The support plates 39A, 39B extend in the forward and rearward directions, perpendicular to the direction in which the laser tube 37 extend. The support plates 39A, 39B are integrally connected by a plurality of tie rods 41.

In order to supply laser gas to the insides of the laser tubes 37, the laser tube 37 is connected to a gas circulation drive means 43, and in addition, in order to cool the laser gas which is heated by electrical discharges inside the laser tube 37, the laser tube 37 is connected to the main heat exchanger 35. That is to say, the gas circulation drive means 43 comprising, for instance, a Root's blower, receives laser gas that has been cooled inside the main heat exchanger 35 and supplies it to the laser tube 37, and is supported on top of the main heat exchanger 35 through a plurality of vibration-absorbing pieces of rubber 45.

On the upper part of the gas circulation drive means 43, there is an auxiliary heat exchanger 47 to remove the heat produced by the gas circulation drive means 43 and to insure adequate cooling of the laser gas supplied to the laser tube 37.

The auxiliary heat exchanger 47 might for example, be a heat exchanger that uses cooling water and be of a box shape. A plurality of connecting pipes 49 are mounted vertically on the top surface of the auxiliary heat exchanger 47, and there are a plurality of connecting pipes 51 each having a base horizontally connected to either side of the auxiliary heat exchanger 47.

The tips of each of the connecting pipes 51 extend to near opposite ends of the laser tube 37, and the connecting pipes 51 are supported near the tips thereof through vibration-absorbing pieces of rubber 53 by supporting blocks 55 mounted on the support platforms 33A and 33B. Consequently, the vibrations of the gas circulation drive means 43 are not transmitted to the support trestle 27 and/or to the support platforms 33A and 33B.

In order to supply the laser gas which is ejected from the gas circulation drive means 43 to the laser tube 37, the connecting pipes 49 are connected to the laser tube 37 near the center thereof. The tips of each of the connecting pipes 51 are connected near the opposite ends of the laser tube 37. More specifically, the laser tube 37 is divided in three sections of a central tube 57 and end tubes 59, 61 at the opposite sides of the central tube 57, and the connecting pipe 49 is connected to the central tube 57 and the connecting pipes 51 are respectively connected to the end tubes 59 and 61, through flexible joints 63 which are made of cylindrical pieces of silicone rubber etc. Consequently, the vibrations of the gas circulation drive means 43 are not transmitted to the laser tube 37, and small shifts in any direction in the relative positions of the connecting pipes 49 and the laser tube 37 are taken up by the flexible joints.

In order to produce electrical discharges in laser tube 37, anode and cathode pairs are mounted at a plurality of locations in the laser tube 37. In order to cool the laser gas that is heated by the electrical discharges in the laser tube 37, the laser tube 37 is connected to the main heat exchanger 35. That is to say, each of the joints 63 has an anode (not shown) provided therein, respectively. Connected between the central tube 57 and the end tubes 59 and 61 of the laser tube 37 through a plurality of cathode assemblies 67 each having a cathode therein (not shown) are gas recirculation paths 65, of which the upper ends are T-shaped and the lower ends are connected to the main heat exchanger 35 through bellows. The cathode assemblies 67 are supported by a holder plate 69 supported by the tie rods 41 connected to the right and left support plate 39A and 39B. Consequently, the laser gas that is supplied from the gas circulation drive means 43 through the auxiliary heat exchangers 47 to the laser tube 37 flows back to the main heat exchanger 35 through the gas recirculation paths 65 and, after being cooled in the main heat exchanger 35, is fed to the gas circulation drive means 43, cooled further securely, by the auxiliary heat exchanger and then supplied again to the laser tube 37.

As clearly understood from the foregoing description, a plurality of locations are provided in the laser tube 37 where electrical discharges are produced by pairs of the anodes and cathodes, and the laser gas heated by the electrical discharges in the laser tube 37 is recirculated back to the main heat exchanger 35 through each of the gas recirculation paths 65. In order to neutralize the laser gas that has been ionized by electrical discharges in the laser tube 37, a suitable catalyst is placed in the midway of each gas recirculation path 65. That is to say, in the midway of each gas recirculation path 65, there is an enlarged portion 71, and within the enlarged portion 71, there is a honeycomb-shaped activated alumina catalyst which might, for example, contain platinum.

In the configuration described above, the catalyst in each of the gas circulation paths 65 is heated by the laser gas, which increases the effectiveness of the catalyst. The laser gas which passes through the enlarged portion containing catalyst is neutralized by the action of the catalyst and then flows back to the main heat exchanger 35 as a neutral gas. Consequently, wasteful electrical discharges which would otherwise tend to occur between the cathodes and the main heat exchanger 35 are suppressed, thereby increasing the efficiency of the input power.

Also as clearly understood from FIG. 2, in order to produce resonance and amplification of the excitation light excited by electrical discharges in the laser tube 37, an output mirror assembly 73, and a rear mirror assembly 75 are provided such that the output mirror assembly 73 which has an output mirror therein, is mounted on one end of the laser tube 37, while the rear mirror assembly 75, containing a suitable reflecting mirror therein, is mounted on the other side of the laser tube 37. The output mirror assembly 73 and the rear mirror assembly 75 are mounted on the support plates 39A and 39B so that their inclination angle can be adjusted freely. Consequently, the mirror adjustment of the laser oscillation section 29 is made by suitable adjustment in inclination angle of each of the output mirror assembly 73 and the rear mirror assembly 75.

Referring to FIG. 2, the attachment section 31 comprises a helium-neon laser oscillator 77, a beam bender 79, a beam damper 81, etc. The helium-neon oscillator 77 is to be used in the adjustment of mirrors in the output mirror assembly 73, the rear mirror assembly 75, etc. in the laser oscillation section 29, and in the adjustment of the optical system in the laser processing system 1. As is clear from FIG. 2, the helium-neon laser oscillator 77 is vertically mounted on a support bracket 83 mounted on the support platform 33A. The beam bender 79 is provided with a reflecting mirror or prism as a beam bending section to selectively bend the laser beam from the helium-neon laser oscillator 77 either into the laser tube 37 in the laser oscillation section 29 or toward the laser processing system 1. The beam bender 79 is located above the helium-neon laser oscillator 77 in the present embodiment and is adapted to move to and fro with reference to the passage of laser beam LB through the operation of a cylinder, etc. The beam damper 81 can absorb or block the laser beam LB from the output mirror assembly 73 in the laser oscillation section 29 and is free to move forward and backward with reference to the path of laser beam LB.

In the construction mentioned above, the laser beam from the He-Ne laser oscillator can be bent and directed to the laser tube 37 or laser processing system 1 when the beam bender 79 is located where the laser beam LB from the laser oscillation section and the laser beam from the helium-neon laser oscillator 77 intersect with each other. Therefore, the helium-neon laser oscillator 77 can be used for the mirror adjustment of the laser oscillation section 29 and the adjustment of the optical system in the laser procesing system 1.

When the beam bender 79 is moved back from the intersecting point, the laser beam LB from the laser oscillation section 29 is directed to the laser processing system 1 for laser processing.

Laser damper 81 has a similar construction as the beam bender 79 to move toward and from the passage of the laser beam LB. The beam damper 81 may be a metallic member in a conical shape which is well polished to absorb the laser beam LB by repeated reflecton, and always cooled by water, etc. Since the laser beam LB is prevented from advancing by the beam damper 81 when located in the passage of the laser beam LB, any unexpected accident which would be otherwise caused by careless supply of the laser beam LB to the laser processing system 1 can be avoided. Whether the beam bender 79 and the beam damper 81 are located on the passage of the laser beam LB or not is detected by a respective limit switch (not shown) arranged in correspondence with the forward position or backward position.

As is clear from the foregoing description, according to the present invention, a single visible light laser oscillator can be used for both of the mirror adjustment in the gas laser oscillator and the adjustment of the optical system in the laser processing system, which provide easy adjustment in the optical system.

Figure 3:
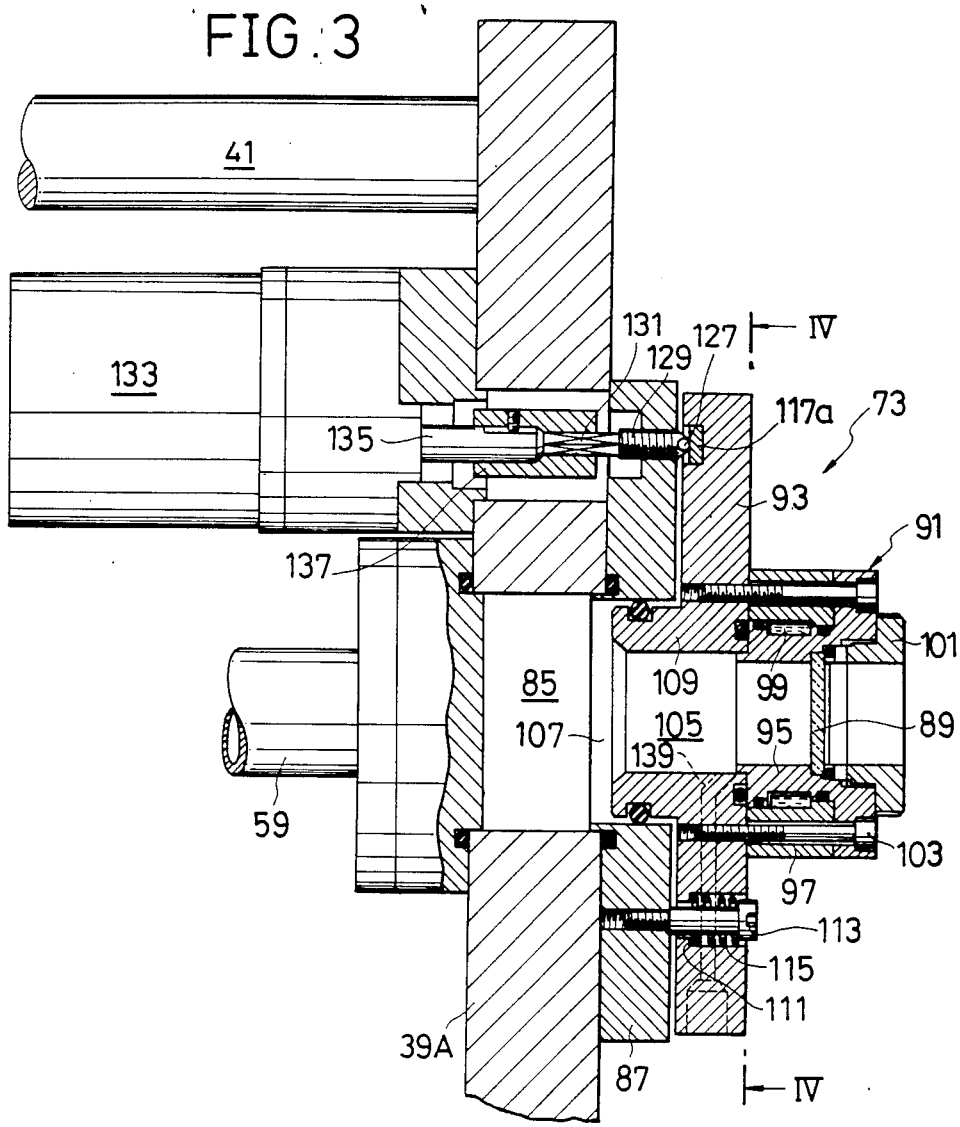
FIG. 3 is an enlarged view of the portion indicated by the arrow III in FIG. 2.

To adjust the mirror in the laser oscillator 3, the output mirror assembly 73 and mirror assembly 75 are supported so that their inclination angle with respect to the support plates 39A and 39B can be adjusted freely. In more detail, as is shown in FIG. 3, the hole 85 passes through the support plate 39A in a position corresponding to the laser tube 37. The output mirror assembly 73 is mounted on the mirror holder bracket 87 which is fixed to the support plate 39A in a position corresponding to this hole 85.

The output mirror assembly 73 consists of the mirror holder ring member 91, which supports the output mirror 89, and the rotatable mirror holder 93 which supports the mirror holder ring member 91. In more detail, the mirror holder ring member 91 consists of an inner ring member 95 and an outer ring member 97 which are integrally coupled. The inner and outer ring members 95 and 97 form a cooling chamber 99 in the space between them, which a cooling medium such as water can flow into and out of freely in order to cool the output mirror 89. The said output mirror 89 is supported inside the inner ring member 95 and is fixed to the inner ring member 95 by a fixing ring 101 which is screwed inside the inner ring member 95.

The mirror holder ring 91 is integrally fixed to the mirror holder 93 by a plurality of bolts 103. Holes 105 which permit the laser beam to pass are opened in the central part of the mirror holder 93. At one side 7 mirror holder 93 there is a ring-shaped protrusion 109 which mates to the holes 107 in the mirror bracket 87. In addition, in a plurality of locations on the other side of the mirror holder 93, concave sections 111 are formed. The coil springs 115 are compressed between the plurality of bolts 113 which are fixed to the mirror holder bracket 87 that passes through these concave sections 111 and the mirror holder 93. Consequently, the mirror holder 93 is biased in the direction of the mirror holder bracket 87 by the action of the plurality of coil springs 115.

Figure 4:
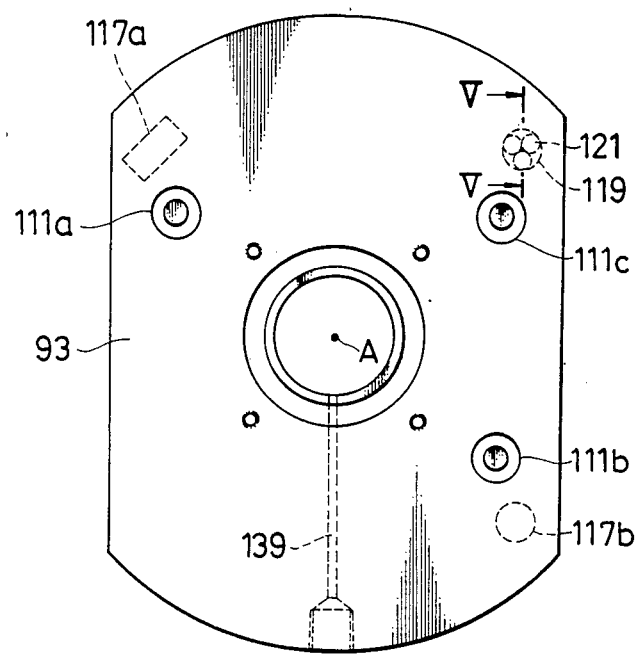
FIG. 4 is a right side elevational view looked in the direction of IV—IV in FIG. 3.
Figure 5:
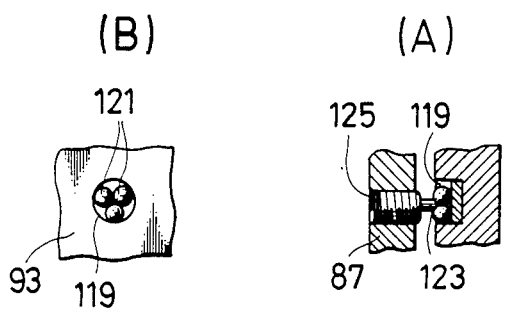
FIG. 5 (A) is an enlarged cross-sectional view taken along the line V—V FIG. 4.

The plurality of concave sections 111, as shown in FIG. 4, are formed at the first and second positions 111a and 111b which are symmetrically located with respect to the shaft center A of the mirror holder 93, and at the third position 111c which is on the approximately perpendicular bisector of the line joining the first and second positions 111a and 111b. In addition, on one side of the mirror holder 93, at positions adjoining the first and second positions 111a and 111b, and at positions which are symmetrical with respect to the shaft center A of the mirror holder 93, hardened seat plates 117a and 117b are sunken. At a position adjacent to the third position 111c on the perpendicular bisector of the line which joins the two seat plates 117a and 117b, a circular concave section 119 is formed, as shown in FIG. 5. The first axis line which connects this concave section 119 to one seat plate 117a and the second axis line which connects the concave section 119 to the other seat plate 117b intersect at a right angle. Three steel spheres 121 are installed inside the concave section 119. The three steel spheres 121 are constrained by the circumferential surface of the concave section 119 and at the same time are in mutual contact and constrain each other.

In order to permit the said mirror holder 93 to rotate, adjustment screws 125 with hemispherical sections 123 which fit singly between the three steel spheres 121 and mate with them are screwed in at positions corresponding to the concave section 119 into which the three steel spheres 121 are fitted. In addition, fine adjustment screws 129 tipped with small spheres 127 which contact the seat plates 117a and 117b are screwed into the mirror holder bracket 87 at positions corresponding to the seat plates 117a and 117b. The bases 131 of the fine adjustment screws 129 are spline-coupled to the output shafts 135 of control motors 133 (such as servo motors) by the spline joints 137 so that they are free to slide.

In the configuration mentioned above, by appropriate operation of the control motors 133 the fine adjustment screws 129 are moved forward and backward. This in turn causes the mirror holder 93 to rotate slightly around the said first axis and second axis, finely adjusting the inclination angle of the output mirror 89.

Sometimes the laser gas which is circulated by the gas circulation drive device 43 contains a minute amount of the lubricating oil used in the gas circulation drive device 43. This minute amount of lubricating oil adheres to and gradually builds up on the output mirror 89. In this embodiment, a countermeasure is taken to prevent lubricating oil from adhering to the output mirror 89. Specifically, at an appropriate number of locations on the mirror holder 93 there are injection holes 139 through which fresh laser gas is injected in the direction of the output mirror 89. A detailed diagram is omitted, but the injection holes 139 are connected to a suitable laser gas supply device such as a gas cylinder.

In the configuration mentioned above, fresh laser gas is injected through the injection holes 139 toward the output mirror 89, cooling the output mirror 89 and, at the same time, sweeping away particles which might otherwise adhere to the output mirror 89. Consequently, laser beam power loss, and rise in temperature and thermal expansion of the output material, which would be caused by the adhered particles, are prevented.

Adjustment of the inclination angle of the mirror in the said rear mirror assembly 75 can be performed by a configuration similar to the configuration described above for the output mirror assembly 73. Consequently, the explanation of the configuration for the rear mirror assembly is omitted.

As can be understood from the above description of an embodiment, this invention makes it possible for the inclination angle of an output mirror etc. to be adjusted easily and automatically. In addition, cooling of the output mirror, etc. can be done effectively and, at the same time, a buildup of adhered particles on the output mirror etc. can be prevented.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A mirror adjustment device for a laser oscillator comprising:
    a mirror holder for installing one of an output and rear laser mirror, said mirror holder supported on a support plate, said mirror holder being mounted on said support plate for free rotation about a first axis which is parallel to the X axis and a second axis which is parallel to the Y axis, and an adjustment motor connected with said mirror holder for selective, slight rotation of said mirror holder about said first axis and said second axis.

2. The mirror adjustment device of claim 1 wherein the mirror holder is supported by a support plate at the intersection of the first axis and the second axis so that it is free to rotate slightly, and a mirror adjustment position is placed at the intersections of the line perpendicular to the center of the mirror holder shaft with the first axis and the second axis.

3. The mirror adjustment device of claim 2, further comprising an injection hole disposed in said mirror holder through which fresh laser gas is injected in the direction of the mirror, and means for injecting laser gas through said injection hole.

4. The mirror adjustment device of claim 3 wherein a plurality of injection holes are provided at a number of locations on the mirror holder.

5. Apparatus for the adjustment of a mirror in a laser oscillator comprising:
    a mirror holder;
    means for retaining the mirror in the mirror holder;
    a mirror holder bracket;
    means for retaining said mirror holder on said mirror holder bracket;
    pivot means supported on said mirror holder bracket and abutting said mirror holder for rotating said mirror holder about the X axis and the Y axis with respect to said mirror holder bracket; and
    drive means for selectively driving said pivo: means to selectively rotate the mirror about the X axis and the Y axis.

6. The apparatus of claim 5 wherein the pivot means further comprises:
    a first recess in the mirror holder, said recess having a circular cross-section;
    three spheres retained within said recess;
    a first fine adjustment screw projecting from said mirror holder bracket, said first fine adjustment screw being aligned with and configured so as to mate with and fit into said three spheres retained within the mirror holder;
    a second recess in the mirror holder;
    a first hardened plate retained within said second recess;
    a second fine adjustment screw projecting from the mirror holder bracket, said second fine adjustment screw being aligned with said first hardened plate retained within the mirror holder;
    a third recess in the mirror holder;
    a second hardened plate retained with said third recess;
    a third fine adjustment screw projecting from the mirror holder bracket, said third fine adjustment screw being aligned with said second hardened plate retained within the mirror holder.

7. The apparatus of claim 6 wherein said means for retaining the mirror holder on the mirror holder bracket comprises three spring-biased bolts connecting said mirror holder with said mirror holder bracket wherein two of said bolts are symmetrically located on said mirror holder about the central longitudinal axis thereof, and wherein the third of said bolts is located substantially on the perpendicular bisector of the line joining the other two bolts.

8. The apparatus of claim 7 wherein the means for retaining the mirror holder on the mirror holder bracket further comprises a ring-shaped protrusion on one side of the mirror holder which mates with a central bore in the mirror holder bracket.

9. The apparatus of claim 8 wherein the drive means comprises a first control motor having an output shaft spline-coupled to the second fine adjustment screw whereby the mirror may be adjusted about the X axis, and a second control motor spline-coupled to the third fine adjustment screw whereby the mirror may be adjusted about the Y axis.

* * * * *